United States Patent
Knapp et al.

(10) Patent No.: US 7,912,381 B2
(45) Date of Patent: Mar. 22, 2011

(54) TRANSMISSION NETWORK HAVING AN OPTICAL RECEIVER THAT UTILIZES DUAL POWER PINS AND A SINGLE STATUS PIN TO LOWER POWER CONSUMPTION, LOWER MANUFACTURING COST, AND INCREASE TRANSMISSION EFFICIENCY

(75) Inventors: David J. Knapp, Austin, TX (US); Tony Susanto, Austin, TX (US); Edmund M. Schneider, Austin, TX (US); Wesley L. Mokry, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 1237 days.

(21) Appl. No.: 11/421,947

(22) Filed: Jun. 2, 2006

(65) Prior Publication Data
US 2007/0280705 A1    Dec. 6, 2007

(51) Int. Cl.
*H04B 10/06*    (2006.01)
(52) U.S. Cl. ............................. 398/207; 398/33; 398/210
(58) Field of Classification Search .......... 398/202–214, 398/33
See application file for complete search history.

(56) References Cited

U.S. PATENT DOCUMENTS

| | | | |
|---|---|---|---|
| 4,553,268 A | | 11/1985 | Tilly |
| 4,989,261 A | * | 1/1991 | Lee ............................ 455/127.1 |
| 5,025,486 A | * | 6/1991 | Klughart ........................ 340/3.1 |
| 5,842,005 A | * | 11/1998 | Walsh et al. .................... 713/500 |
| 6,407,840 B1 | * | 6/2002 | Shien-Te et al. .............. 398/207 |
| 6,810,216 B1 | | 10/2004 | Tourunen |
| 2003/0060185 A1 | * | 3/2003 | Fisher et al. .................. 455/344 |
| 2003/0076569 A1 | | 4/2003 | Stevens |
| 2005/0051704 A1 | | 3/2005 | Kashiura et al. |
| 2005/0213270 A1 | * | 9/2005 | Shimizu .......................... 361/42 |
| 2009/0057540 A1 | * | 3/2009 | Nyffenegger et al. ... 250/227.11 |

FOREIGN PATENT DOCUMENTS

| | | |
|---|---|---|
| EP | 1109336 | 6/2001 |
| WO | 00/10270 | 2/2000 |
| WO | 01/06666 | 1/2001 |

OTHER PUBLICATIONS

International Search Report, PCT/US2007/062327, mailed Jan. 22, 2008.

* cited by examiner

*Primary Examiner* — Dzung D Tran
(74) *Attorney, Agent, or Firm* — Kevin L. Daffer; Daffer McDaniel, LLP

(57) ABSTRACT

A communication network is provided for interconnecting a network of digital systems, such as multimedia devices. Each node of the communication network may include a receiver and a transmitter. The receiver and transmitter of each node can be an optical receiver and transmitter. The optical receiver is preferably powered by two power supply pins, each providing different supply amounts. An activity detector within the receiver can be powered from a first supply amount, and the signal path of the optical receiver can be supplied from a second supply amount greater than the first supply amount. The first supply amount is provided at all times, and the second supply amount is only provided if activity is detected. A voltage regulator which provides the first supply amount can be beneficially embodied on the same integrated circuit as a network interface to reduce the manufacturing cost of the network. By powering the activity detector separate from the signal path, power down and power up (normal) operating states are envisioned for reducing power consumption and increasing longevity of the optical receiver and transmitter.

21 Claims, 5 Drawing Sheets

TRANSMISSION NETWORK HAVING AN OPTICAL RECEIVER THAT UTILIZES DUAL POWER PINS AND A SINGLE STATUS PIN TO LOWER POWER CONSUMPTION, LOWER MANUFACTURING COST, AND INCREASE TRANSMISSION EFFICIENCY

BACKGROUND OF THE INVENTION

1. Field of the Invention

This invention relates to a communication network and, more particularly, to an optical receiver that comprises an activity detector powered from a lower power supply (e.g., lower supply current) produced from a first portion of a network interface, and for detecting an incoming signal to the receiver and forwarding a status signal used in enabling a higher power supply (e.g., higher supply current) that powers the remaining, second portion of the network interface as well as a data processing signal path of the optical receiver.

2. Description of the Related Art

The following descriptions and examples are not admitted to be prior art or conventional by virtue of their inclusion within this section.

Communication networks are generally well-known as containing at least two nodes interconnected by a communication line or link. Each node may include both a transmitter and a receiver, generally referred to as a transceiver. The transceiver provides an interface between signals sent over the communication link and an electronic subsystem which can operate upon the signal within, for example, the digital domain. If the communication link is an optical fiber, then the receiver circuit converts light energy to an electrical signal. Conversely, the transmitter can convert electrical signals to an optical signal that is then forwarded across the communication link to the receiver within another node of the network.

An optical transmitter generally involves a light emitting diode, or LED. An optical receiver can include a photodetector. There are many types of photodetectors generally known to those skilled in the art. For example, a common photodetector is a photodiode or PIN photodiode. A receiver, in whatever form, consumes considerable amounts of current and, therefore, must be powered from a power supply that is capable of sending significant current into the trans-impedance amplifier of the receiver when light impinges upon the photodetector. Likewise, the transmitter can also consume considerable current whenever light is driven onto the optical link. Not only would large current increase power consumption within the communication network, but also would increase heat dissipation. The translucent plastic optical link coupled near the LED's can darken and turn partially opaque if too much power is consumed and/or if too much heat is dissipated.

In addition to undesirable power consumption and heat dissipation, it is generally known that the transmitters and receivers send and receive, respectively, light only when data is being sent across the network. However, there are many times in which the network is inactive. In portable applications, where the network is powered from a battery, it would be desirable to power down the network so that battery life is extended whenever communication is inactive. Not only would battery life be extended, but the longevity of the LED's and photodetectors would also be extended. A communication network that can selectively power up and down depending on communication activity and can also periodically calibrate for optimal transmit and receive power is not only desirable, but can be important in the low power operational modes of modern integrated circuits. Conventional networks heretofore cannot easily achieve these advantages in a cost-effective manner.

SUMMARY OF THE INVENTION

The problems outlined above are in large part solved by a communication network that can be selectively powered when activity is detected within the communication link. Otherwise, the network remains in a low power state. Moreover, the transmitters at manufacture can be easily calibrated after manufacture and, after coupled in the field to a communication network, and thus can have their outputs periodically adjusted. If necessary, the network links can be tested by placing the transmitters in a diagnostic mode. When a receiver receives an incoming signal, the incoming signal can be compared against a predetermined signal strength. If the incoming signal is above or below a predetermined amount, then the transmitter can be driven to a higher or lower output accordingly. One mechanism in which to accomplish selective power up of the communication network is to utilize two supply pins on the receiver circuit. One supply pin can provide a first supply amount to a first portion of the receiver circuit. The other supply pin can supply a second supply amount, preferably greater than the first amount, to a second portion of the receiver circuit. The first and second supply amounts can be currents. Moreover, the first supply amount is preferably applied to an activity detector circuit, whereas the second supply amount is applied to the remaining circuitry of the receiver, which includes a data input port and a data processor.

The first supply amount is preferably 10, more preferably 100, and can also possibly extend upwards of 1000 times less than the second supply amount. The activity detector is powered from the first power supply pin, which preferably supplies 1-10 µA. Only when the activity detector determines that light is present in the communication link will the receiver circuit send a status signal across a status pin. The status pin on the receiver circuit is linked to a status pin on a network interface circuit. Once the status signal is received on the network interface, the network interface then will enable a power supply regulator to generate the second power supply amount, which is then sent to the second power supply pin of the receiver as well as a portion of the network interface circuit.

The present communication network includes a set of nodes, interconnected by a communication line or link. The link can be an optical link, such as an optical cable. Each node includes a receiver and a transmitter, as well as a network interface circuit coupled to the receiver and transmitter. The receiver is preferably an integrated circuit separate and apart from the network interface circuit, and preferably includes several pins, three of which are a first power supply pin, a second power supply pin, and a status pin. The first power supply pin receives a first supply amount from a battery, whereas the second power supply pin receives a second supply amount from a voltage generator coupled to a battery. The status pin is bidirectional and can send and receive multi-bit packets of data to and from a network interface, also contained within the same node as the receiver.

The transmitter circuit preferably encompasses only an LED. The LED receives input from a driver circuit, preferably contained on an integrated circuit separate and apart from the LED. Preferably, the driver circuit is embodied on a monolithic substrate also containing the network interface circuit. The network interface integrated circuit, separate from the LED and the receiver, may contain memory which can compare the incoming signal sent from a receiver to a predetermined value stored in the memory. Alternatively, the receiver integrated circuit can compare the incoming signal power to a predetermined value and then forwards the compare result to the network interface integrated circuit. Depending on that comparison, the interface circuit then can forward via its programmable driver an increased or decreased signal strength from the interface circuit to the upstream transmitter.

A voltage generator within the network interface is used to produce the first supply amount sent to the first power supply pin of the receiver circuit. A special, high voltage integrated circuit is not needed for producing the first supply amount. The portion of the network interface used to produce the first supply amount is applied to only the activity detector within the receiver circuit, and only the logic within the network interface that receives the status signal from the activity detector. Therefore, the activity detector remains always on and powered through the first power supply pin, whereas the other portions of the receiver and the other portions of the network interface receive power only if and after activity is detected. In this fashion, the dual power pins and single status pin of the optical receiver serves to lower power consumption within the overall network. A lower manufacturing cost is achieved by implementing the voltage regulator within the network interface integrated circuit, and not on a separate, high voltage integrated circuit. Transmission efficiency is increased by utilizing a programmable driver within the network interface, and allowing the programmable driver to produce optimal output depending on the comparison of the received signal to a predetermined (optimal) signal strength.

BRIEF DESCRIPTION OF THE DRAWINGS

Other objects and advantages of the invention will become apparent upon reading the following detailed description and upon reference to the accompanying drawings in which.

Figure 1:
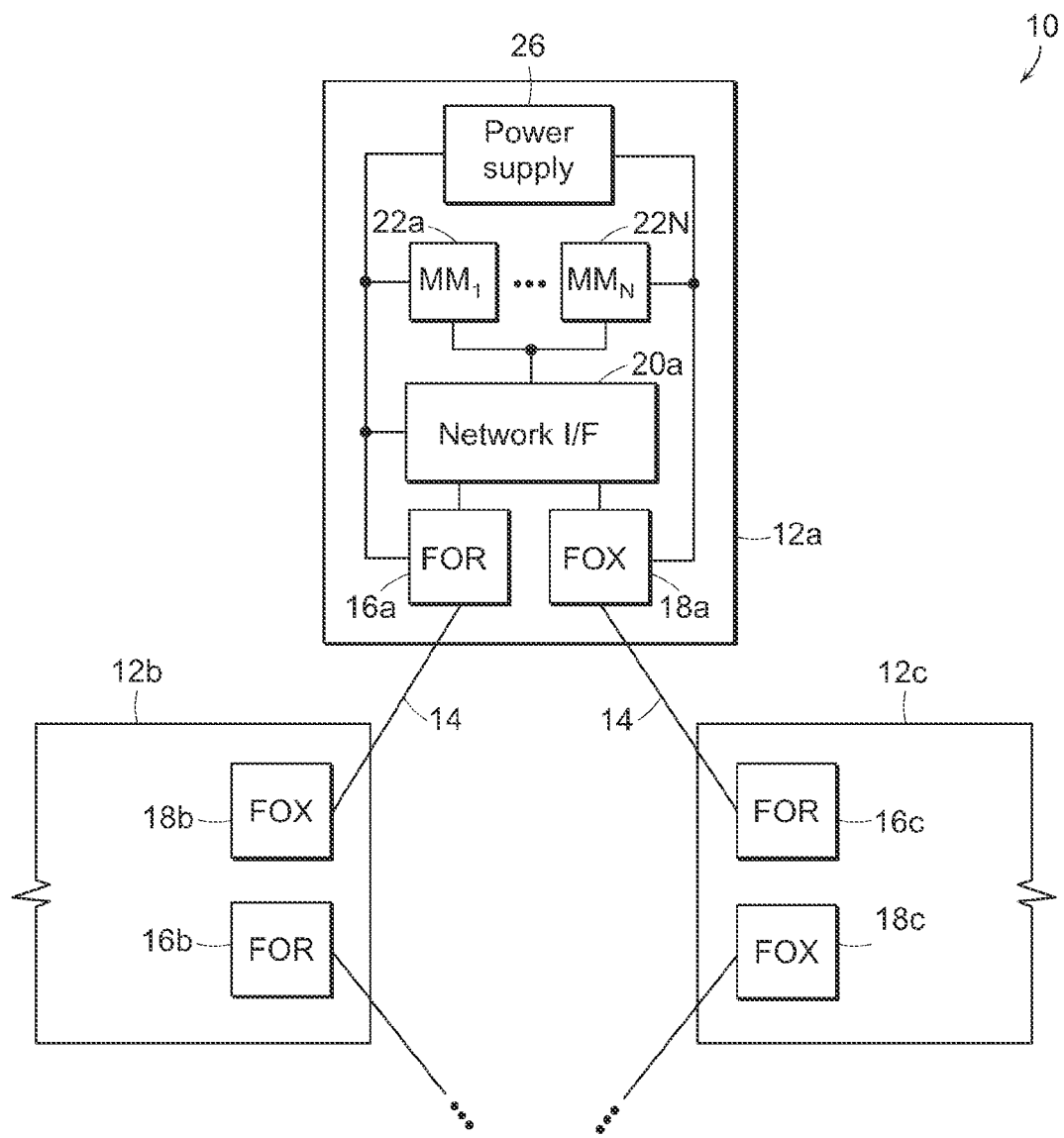
FIG. 1 is a block diagram of interconnected nodes within a communication network, with one node shown in detail and powered from a single power supply.

While the invention is susceptible to various modifications and alternative forms, specific embodiments hereof are shown by way of example in the drawings and will herein be described in detail. It should be understood, however, that the drawings and detailed description thereto are not intended to limit the invention to the particular form disclosed, but on the contrary, are intended to cover all modifications, equivalents, and alternatives falling within the spirit and scope of the present invention as defined by the appended claims.

DETAILED DESCRIPTION OF PREFERRED EMBODIMENTS

Turning now to the drawings, FIG. 1 illustrates a communication network 10, comprising a plurality of nodes 12 that are linked together by a communication link 14. Communication link 14 is preferably an optical cable through which light can be transmitted. Nodes 12 are separated from each other, yet communicate with one another via communication link 14. Within each node 12 is a fiber optic receiver (FOR) 16 and a fiber optic transmitter (FOX) 18. The various components of an exemplary node 12a are shown in more detail. For sake of brevity, the other nodes 12b and 12c illustrate only the transceivers, yet it is understood that all nodes have approximately the same components as that shown in node 12a.

Linking the transceiver portion 16a and 18a is a network interface 20a. The network interface serves to process the incoming data and perform all such functions needed to interface with various multimedia devices 22a-22N, for up to N possible multimedia devices. One function of interface circuit 20a is to parse different types of incoming data into the appropriate multimedia device. For example, network 10 may be capable of sending both streaming and packetized data across communication links 14. As the incoming data is received by the receiver circuit 16a, network interface 20a determines the appropriate channel for that data, performs any necessary decoding or decryption, and places the data upon the appropriate multimedia device. Likewise, as a multimedia device produces data, the data is taken by interface 20a, and placed upon the transmitter 18a within the appropriate time slot or channel of link 14. Finding the time slot and channel needed to accommodate different types is but one function of network interface 20a. Other functions are also available and would be appreciated to one skilled in the art having the benefit of this disclosure.

In order to perform the various functions of node 12a, a single power supply 26 can be used. Power supply 26 not only provides power for the receiver and transmitter, but also for each multimedia device and the network interface. Power can be supplied both when light is present and when light is absent. However, applying power when network 10 is active and inactive consumes an undue amount of power, shortens the longevity of the LED's, and generally proves inefficient in the overall operation of a portable, battery-operated device.

Figure 2:
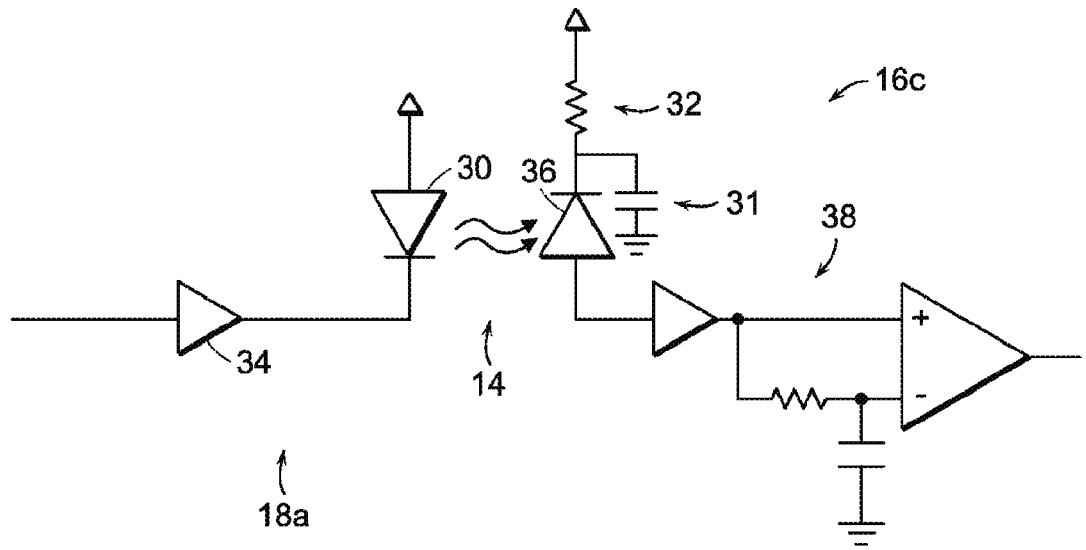
FIG. 2 is a circuit schematic of only a portion of an optical transmitter and receiver linked by an optical signal path of the communication network.

FIG. 2 illustrates one example of a transmitter 18a, optically coupled to a receiver (i.e., receiver 16c). While one optical link is shown, other optical links can also be illustrated such as the optical link between transmitter 18b and receiver 16a, for example. In the example of FIG. 2, transmitter 18a can include an LED 30 that converts electrical signals to optical or light energy forwarded across communication line 14. The load capacitance and the associated electrical driver 34 can require a substantial amount of drive current. Similarly, photodetector 36 and amplifier circuitry 38 can also require a significant amount of current consumption, which is hastened at higher bit rates. Typically, however, photodetector 36 is coupled through a resistor 32 to a power supply and through a capacitor 31 to ground. Photodetector 36 is capable of sending significant amount of current into amplifier 38 whenever light is present. However, when light is not present, a power supply is nonetheless needed yet with preferably a lesser supply amount.

Figure 3:
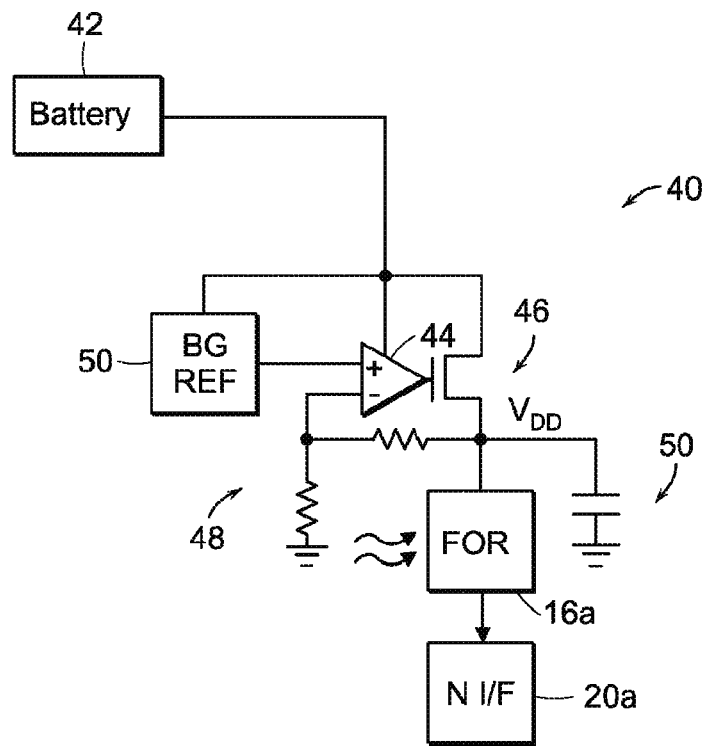
FIG. 3 is a block diagram of an optical receiver powered from a single power supply pin feeding a power regulator that produces differing supply currents, and thus a low power supply (low supply current) and a high power supply (high supply current), depending on whether the receiver is receiving light.

FIG. 3 illustrates a less than optimal power regulator circuit 40 used for providing power to the receiver circuit. If a single power supply pin is used by the receiver circuit 16a (FIG. 1) or receiver 16c (FIG. 2), then power regulator circuit 40 can be used. A battery 42 can provide between 7-12 volts, for example. Power from the battery is applied to an amplifier 44, which is coupled to the gate of a transistor 46. A feedback circuit made up of a resistor divider 48 provides a feedback voltage that is compared against a bandgap reference voltage produced by a bandgap reference circuit 50. The bandgap reference circuit can be, for example, a resistor divider network. If the feedback voltage is lessened, possibly due to receiver 16a receiving light, then the inverting input of amplifier 44 will be drawn downward toward ground. This causes amplifier 44 output to increase and the overall resistance of the source-to-drain path of transistor 46 to decrease—thus, pulling the $V_{DD}$ node upward and, in addition, pulling the feedback voltage back toward the bandgap reference voltage. Thus, as light is received or no light is received, the current through transistor 46 will vary. For example, as light is received, the current can extend upward between 10-50 mA, however, if no light is received, then the current can be between 10-50 µA.

The varying current fed to receiver 16a via a single pin is sometimes difficult to achieve within a specified current boundary. Even though a holding capacitor 50 can retain $V_{DD}$ within a fairly close voltage range, the current sourced by $V_{DD}$ node can vary dramatically. Thus, the power consumed by receiver 16a can also vary dramatically. Instead of having a single power supply pin, it would be more preferable for receiver 16a to have two power supply pins and only a portion of receiver 16a receiving power when the network is inactive. This will cause the network to consume less power, increase longevity of the optical circuits and, as will be described below, minimize the manufacturing complexity of a node.

Figure 4:
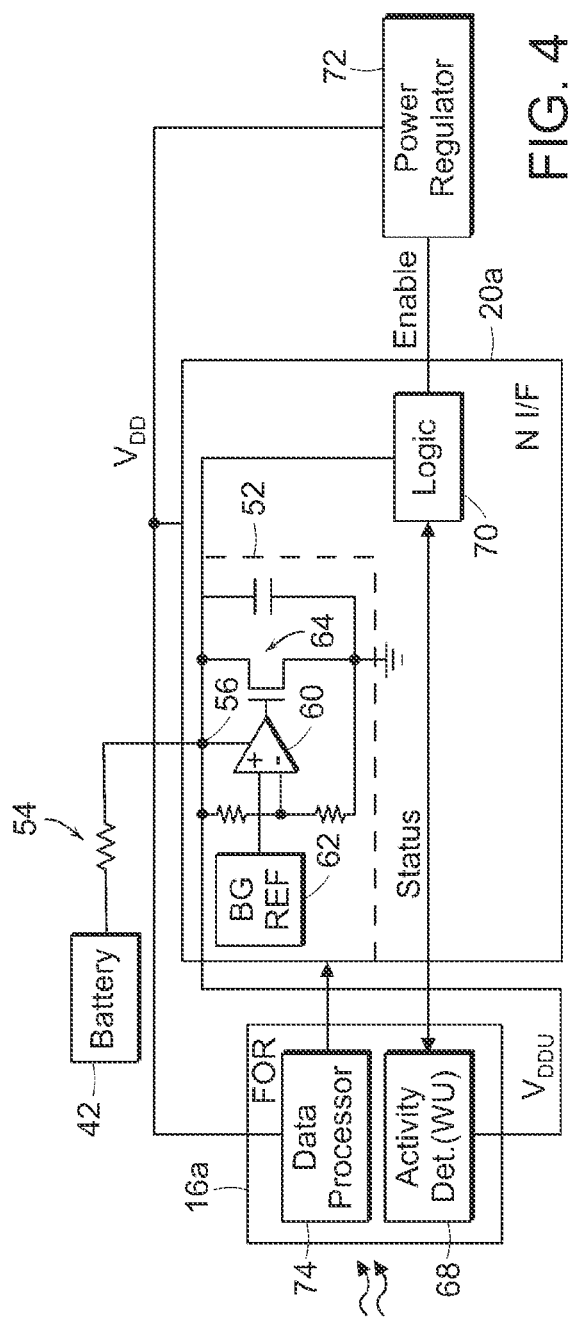
FIG. 4 is a block diagram of a more preferred optical receiver powered by two power supply pins, one of which is a low power supply (i.e., low supply current) and the other of which is a high power supply (i.e., a high supply current), wherein the low power supply is produced from a first portion of a network interface an applied to an activity detector, and wherein the high power supply is produced from a power generator when an incoming signal is detected by the detector and thereafter supplied to other portions of the optical receiver and the network interface.

FIG. 4 illustrates a more preferred voltage regulator circuit 52 (shown in dashed line). Voltage regulator 52 can be placed upon the same monolithic substrate that bears the network interface 20a. Although a 7-12 volts battery 42 supplies voltage to regulator 52, an isolation resistor 54 is used not only to reduce the voltage at node 56, but also reduces the current supplied by $V_{DDU}$ at node 56 into a first power supply pin of receiver 16a. During operation, regulator circuit 52 encounters a voltage-divided amount on one input of amplifier 60 that is roughly equal to the voltage produced by the bandgap reference 62. Therefore, the output from amplifier 60 is fairly small, causing very little current to be drawn through transistor 64. However, if isolation resistor 54 is fairly large, e.g., greater than 10 kΩ and preferably equal to or greater than 20 kΩ, then little current will be drawn through resistor 54, even though the voltage differential from the output of battery 42 and the voltage at node 56 can exceed 4-8 volts.

The fairly small current gets partially consumed through transistor 64, but the remainder goes into the $V_{DDU}$ pin (i.e., the first power supply pin) of receiver 16a. More particularly, $V_{DDU}$ is applied to the activity detector or the wake-up circuitry 68 of receiver 16a, but not to all other circuitry within receiver 16a. Unlike voltage regulator 40 of FIG. 3, regulator 52 of FIG. 4 can be embodied upon the same monolithic substrate as network interface 20a. This is due primarily to voltage regulator 40 requiring a high voltage supply signal and, therefore, a substrate which can accommodate the higher voltage supply, as opposed to the lower voltage supply at node 56 of FIG. 4. The lower voltage supply at node 56 is, therefore, compatible with the lower voltages applied to the network interface 20a. Since regulator 52 operates the same voltage as the other circuitry within network interface 20a, regulator 52 enjoys the economical benefit of being able to be embodied on the same substrate and, therefore, lessens the overall manufacturing cost of the ensuing regulator.

While $V_{DDU}$ is applied to a first power supply pin, a second power supply pin can accommodate $V_{DD}$. $V_{DD}$ can produce a second supply amount, preferably current much greater than the current that can be supplied by $V_{DDU}$. The second supply amount arises whenever the activity detector 68 of receiver 16a receives light. When this occurs, a status signal is sent across a single pin from activity detector 68 to logic 70 within network interface 20a. Logic 70 performs any necessary decoding of the status signal and produces an enable signal forwarded to a power regulator 72. Regulator 72 produces the second supply amount within $V_{DD}$. $V_{DD}$ is then connected to all other circuitry besides logic 70 and regulator 52 within network interface 20a, as well as all other circuitry besides activity detector 68 within receiver 16a. Specifically, the remaining circuitry within receiver 68 can be classified as a data incoming port and a data processor 74 within a signal path of receiver 16a.

Figure 5:
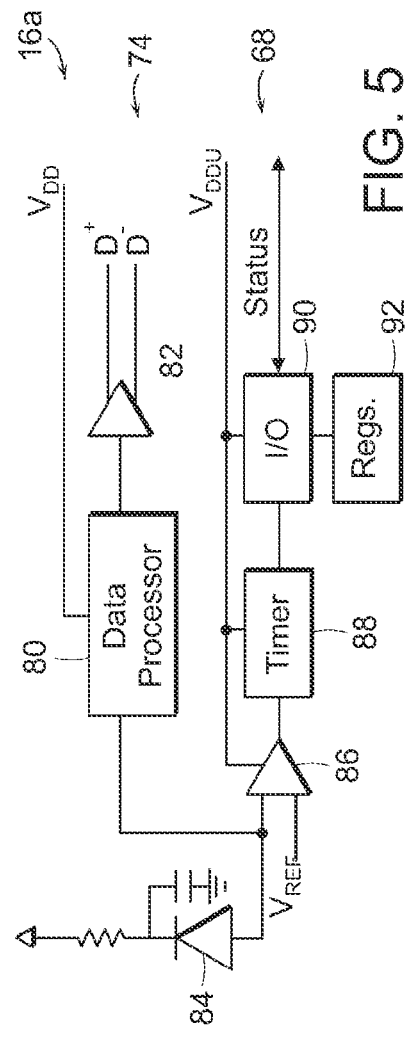
FIG. 5 is a detailed block diagram of an activity detector and data processor portions of the optical receiver of FIG. 4.

FIG. 5 illustrates one example of a receiver circuit 16a. Receiver circuit 16a is similar to all receiver circuits within a communication network 10 of FIG. 1. Receiver 16a can be partitioned into two major circuit elements: data processor portion 74 and activity detector portion 68. Data processor portion 74 includes a data processor 80 and an amplifier 82 having differential outputs D+/D−. Data processor 80 receives the incoming signals that have been converted by a photodetector 84, powered by $V_{DD}$ and/or $V_{DDU}$. For example, when activity is detected by activity detector 68, photodetector 84 can be powered by $V_{DD}$. Before activity is detected, however, photodetector 84 can be powered by $V_{DDU}$. A multiplexer can be used, for example, to receive $V_{DD}$ and $V_{DDU}$, the outcome of which is selected by the status signal. Activity detector 68 can include an amplifier 86 which compares the incoming signal to a reference signal. If the incoming signal exceeds an amplitude of the reference signal, then a timer 88 will be activated. The timer can be a sequence of clock pulses. If the signal output from amplifier 86 remains active for the timeout period of timer 88, then an activity is signaled, possibly the indication of a light for a predetermined amount of time. That signal can then be buffered by an input/output buffer 90 to produce a status signal on a status pin of receiver 16a.

Figure 9:
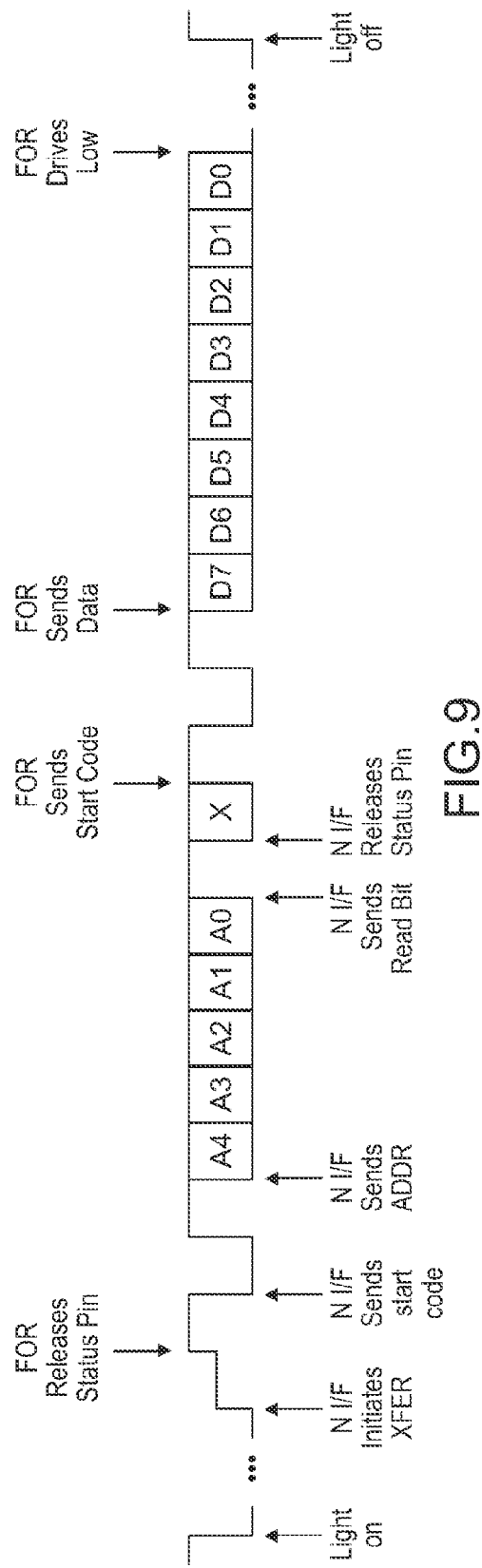
FIG. 9 a bit sequence of a status signal sent across the status pin during a read transfer of data from the optical receiver to the network interface.

As will be described below, the status signal is bidirectional and can send a status signal to the network interface 20a (FIG. 4), or can receive a status signal back from network interface 20a to buffer 90 for writing to configuration registers 92. Importantly, however, activity detector portion 68 is powered by $V_{DDU}$ and the data processing portion 74 is powered by $V_{DD}$. As shown, receiver 16a includes two power pins and a single status pin. The single status pin indicates whether activity has been detected or not. If activity is detected, then a status signal is sent as shown in FIG. 9.

Figure 6:
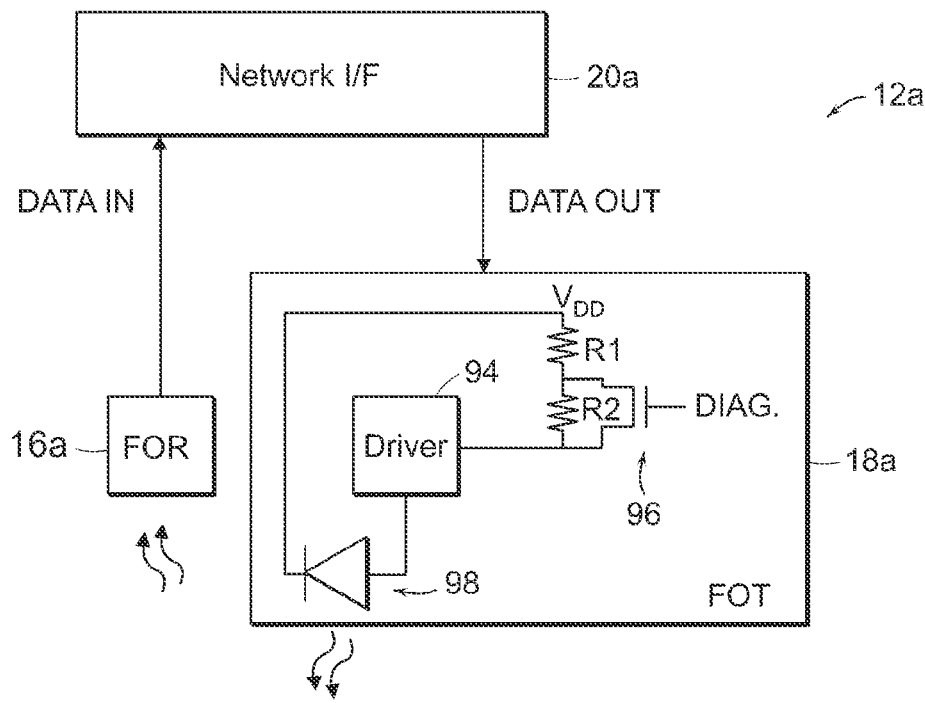
FIG. 6 is a block diagram of an optical transmitter with a variable driver placed in diagnostic mode to test the optical signal path of the communication network.

FIG. 6 illustrates a portion of node 12a and, in particular, a receiver 16a, network interface 20a, and transmitter 18a. Receiver 16a detects activity. If activity is detected in the incoming optical signal, then the remaining portion of receiver 16a is activated by a second power supply pin—thus, allowing data to be converted from optical energy to electrical energy, and processing functions to take place. The incoming data (DATA IN) is sent to network interface 20a where further processing can occur. Transmitter 18a can have, for example, a programmable output. If a diagnostic signal is sent to transmitter 18a (DIAG.), then the power supplied to driver 94 can be reduced via activation of switch 96. If the resistor values R1 and R2 are equal, then the power supply applied to driver 94 is reduced by one-half—thus, sending an optical signal reduced by one-half power from LED 98.

A diagnostic mode of operation allows an operator to reduce the transmitted signal strength, and to test the receiver to determine whether the receiver can still receive an incoming signal. The transmit power can possibly be specified within a particular range of, for example −1.5 dBm to −10 dBm. The receiver may also be specified to operate from −2 dBm down to −23 dBm. If the transmitter output is reduced by one-half and the receiver cannot detect any incoming signal, this may be due to process variations, or due to unacceptable attenuation within optical communication link. Assuming, in the above example, a worse-case transmit signal of −10 dBm, the maximum attenuation that the link can tolerate and still allow the receiver to operate at −23 dBm, the attenuation must not be greater than −13 dBm. If the attenuation of a link is at −13 dBm, then the diagnostic will reduce the power at the receiver to −26 dBm, causing the receiver to fail. Any undue attenuation will cause the receiver to be unable to receive the incoming signal. Therefore, the diagnostic operation of FIG. 6 can test the overall functionality of the system by placing the transmitter in the worse-case scenario, and checking the receiver capability.

While placing the diagnostic circuitry 96 within the transmitter allows a diagnostic operation, it is oftentimes difficult to know how far to reduce the transmitter output based on the receiver input. For example, if receiver 16a is operating in a less than optimal condition or if the multimedia device conveyed through network interface 20a does not produce sufficient drive, then the DATA OUT signal cannot be easily ascertained and the proper attenuation mimicked within circuit 96 for any given incoming signal or DATA OUT signal. A more optimal calibration or diagnostic technique is shown in FIG. 7.

Figure 7:
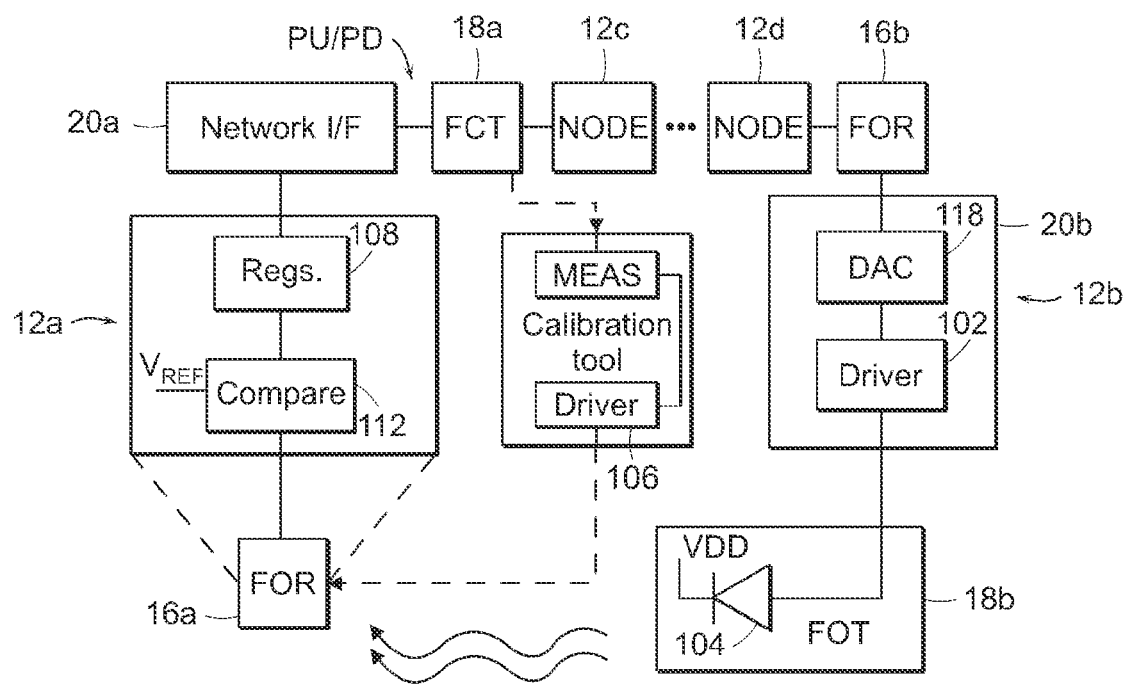
FIG. 7 is a block diagram of a more preferred optical transmitter having a variable driver placed in a network interface for varying the transmitter output of an upstream transmitter depending on power output from a downstream receiver within a network, the transmitter output can vary depending on normal usage for recalibrating the transmitters within the network to optical receive sensitivity, or can vary if placed in a diagnostic mode of operation and, in addition to periodic calibration, a calibration tool can be used to calibrate a transmitter after manufacture by setting a maximum output power from the transmitter.

Referring to FIG. 7, a network interface 20a can be used to receive status information from receiver 16a. Within receiver 16a is compare circuitry 112, which compares the received optical signal against a predetermined reference voltage $V_{REF}$ (possibly stored in memory). The compare result, possibly either a logic "1" or a logic "0" is stored in a register 108 within receiver 16a. For example, if the received optical signal is below $V_{REF}$, then a logic 1 value can be stored in register 108. If received optical signal is above $V_{REF}$, then a logic 0 value can be stored in register 108. The appropriate logic value can then be periodically fetched by the network interface 20a, which then produces either a power up (PU) or a power down (PD) message depending on the logic state stored in register 108. For example, if a logic 1 is stored indicating the received optical signal is above $V_{REF}$, then a PU message is produced by network interface 20a and sent to the upstream network interface 20b via transmitter 18a and receiver 16a. The upstream network interface 20b then increases the transmitted power via driver 102 in response to receiving the PU message.

Driver 102 can be manufactured on the same monolithic substrate as interface 20a, and can be programmed by registers operably coupled thereto. Driver 102 can be programmed to output a reduced optical power. The reduced optical power may be the result of a command issued to one or more nodes when the system is operating in a diagnostic mode. Such a command can instruct network interface 20a to reduce the optical output power from transmitter 18a, which reduces the optical input power to receiver 16b. The amount of reduction can be programmably changed. For example, the optical power may be reduced by 3 dB in diagnostic mode. If the link still works, there must obviously be more than 3 dB of margin. If the link does not work, then the link is considered marginal and must be replaced. Therefore, instead of having a separate diagnostic pin (FIG. 6), the driver 102 output of FIG. 7 can be programmed in software, for example. The improved configuration includes only an LED 104 within transmitter 18a. The remaining circuitry for driving LED 104 is retained within the integrated circuit of interface 20b.

In addition to testing the network links, transmitters, and receivers in a diagnostic mode, each transmitter can be tested after manufacture and before placing the transmitter in a network. Preferably, each transmitter output power is set during this operation so as to be as close as possible, but not to exceed a predefined value. A calibration tool 106 can be coupled across the transmitter output and receiver input for each node, immediately after manufacture. Tool 106 is used primarily during manufacture of a node and not during operation of the overall network, after the node is inserted into the network. Tool 106 measures the optical output power from a transmitter 18a of node 12a and sends this value in a message to network interface 20a. If the transmitter produces an amount greater than, for example, −1.5 dBM, then tool 106 forwards a message into node 12a and, specifically, the configuration registers to reduce output from transmitter 18a, This process continues until less than −1.5 dbM is read on receiver 16a, at which time, the value used to set the transmitter output to as close as possible, but still less than −1.5 dBM is stored in non-volatile memory to preclude transmitter 18a from producing a value greater than −1.5 dbM in the field, during use.

The primary factors that affect the transmitted power range include the LED and driver manufacturing process variations, LED and driver temperature variations, and LED aging. Process variations can be calibrated by the set makers after placing the interface 20a and transmitter 18a on, for example, a printed circuit board. Temperature and aging variations can be compensated by the interface 20a based on typical measurements of the transmitter 18a and the driver within network interface 20a.

After manufacture, the calibration tool 106 can be removed from each node transmit/receive ports, and the network can be formed (as indicated by dashed lines noting the coupling tool 106 is removed from each node after they have been manufactured). Transmitters can be periodically calibrated in the field, possibly during each time in which the network is activated by turning on a node. For example, receiver 16a can measure the received optical power from transmitter 18b. If the received power is above a certain level, then network interface 20a sends a message to network interface 20b, requesting that it lower its LED driver 102 output. After interface 20b lowers its driver current, interface 20a will check receiver 16a. If the received power is still above the threshold, interface 20a can send another message to interface 20b to reduce its output again. This process repeats until receiver 16a detects that the received power is below the threshold. Once it is below the threshold, interface 20a sends messages to interface 20b to increase its drive current until the received power is just above the threshold. The value is then stored in the register within one or more interface units.

Over time, however, the attenuation in the link between transmitter 18b and receiver 16a will degrade possibly due to aging, dirt accumulation in the connects, etc. Whenever interface 20a reads receiver 16a and determines that the received power is below the threshold, interface 20a will send messages to interface 20b to increase its drive current and the transmitter 18b optical output power. At some point the attenuation may become so bad that interface 20b cannot increase its output current without the possibility of exceeding the eye safety limit of, for example, −1.5 dBM. When this happens, interface 20a or 20b will notify the central system controller that the link is marginal, which will be reported to the user or technician. The technician can read all the diagnostic information stored in the network interface units and determine if any of the optical links are marginal; however, the technician may not know how marginal. To determine if there is still 3 dB of margin, for example, the technician can send commands in diagnostic mode to reduce the transmitted optical power from each transmitter by 3 dB. If the system still works properly, then there is still 3 dB of margin.

If the signal strength exceeds a predetermined value, then a power down (PD) message can be sent via the network to the upstream network interface having a digital-to-analog converter 118, for example. Converter 118 will then reduce the output from driver 102. However, if the signal strength is less than the predetermined value stored in memory 110, then a power up (PU) signal will be sent to converter 118 which increases the output from driver 102.

Firmware in the form of non-volatile memory can be used to store the predetermined voltage value, and to adjust the output power of the upstream transmitter 18a based on the input power of the downstream receiver 16a. For links with little optical attenuation, the advantages include low power consumption, lower electromagnetic emissions, and improved LED reliability. This can be achieved by monitoring the incoming optical signal upon receiver 16a, comparing the signal to a predetermined value within the receiver and lowering the transmit power of an upstream transmitter. In this fashion, the transmit power can be continuously monitored so that there is just enough transmit power to maintain signal integrity, yet lowers the power consumption and emissions, and reduces heat dissipation and damage to the LED caused by overdriving the LED for significant periods of time. Thus, during normal operations, the receive power indicator is periodically monitored. If the transmit port is already outputting the maximum guaranteed safe power, the applications are notified. Depending on how well process, temperature, and aging variations are compensated, determination can be made on how close to the −1.5 dBm the transmitted power is guaranteed to be.

In the simplest mode of operation, the status pin operates solely as a digital status output, indicating when the receiver 16a is in a low power mode or in a normal operating mode. A low power mode is when there is no light present on the photodetector, whereas a normal operating mode is when light is present. The status pin provides bidirectional serial communication, allowing an external controller to access the internal registers of the receiver and/or network interface associated with that receiver, and to adjust the receiver and network interface operation. The status line operates using a serial asynchronous format. Internally, there are a number of 8-bit registers including a register address pointer. The first transfer after the line is activated must be a write transfer with the first byte containing two start bits (01), five address register bits, an MSB bit first, that are loaded into the register address pointer, and a read/write bit which specifies the direction of the subsequent transfer. If read/write is low, the subsequent byte is written to the register pointed to by the read address register. If read/write is high, a byte is read from the register pointed to by the register address pointer. The register address is five bits wide, allowing for up to 32 internal registers.

The status line can be activated when there is a valid light entering the receiver, causing the status signal to transition to a logic 0 level. When it is activated, the internal oscillator turns on and clocks the state machine. Once a transfer is complete, the internal oscillator is turned off if it is not being used by the power management state machine. There need not be an external clock associated with the data on the status pin—the data is sent in an asynchronous manner and the receiver internally oversamples the signal on the status pin, regenerates a clock from that data, and samples the data. The data can be sent in an NRZ format. The receiver can always be in a slave mode for timing recovery.

Figure 8:
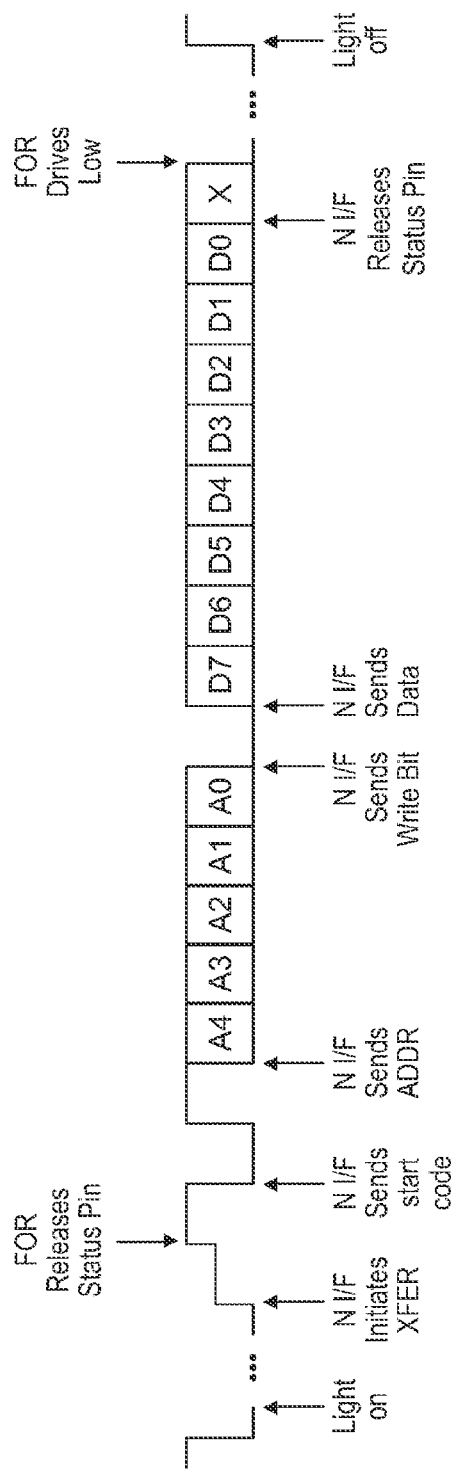
FIG. 8 a bit sequence of a status signal sent across the status pin during a write transfer of data from the network interface to the optical receiver.

FIG. 8 illustrates a write transfer and, specifically, a writing of data from the network interface 20a to receiver 16a via the status pin. To initiate a transfer, light is detected and the status signal transitions to a logic low voltage value. Thereafter, the master device (i.e., the network interface) will assert a high on the status pin for approximately 200 μs which will cause the status pin to go to mid-rail. This condition will wakeup the receiver which will release the status pin and wait for the correct start sequence in which the network interface sends the start code of 01. The system may time out after approximately a predetermined number of clock cycles if the proper sequence is not received. Once the sequence is received, the network interface will send the address through a 5-bit address. If, as shown in FIG. 8, the network interface will be writing to the receiver, then the network interface sends a write bit of logic 0 voltage value. Thereafter, the network interface forwards the 8-bits of data and immediately thereafter releases the status pin. Sometime thereafter, the receiver will drive the status pin low as shown.

FIG. 9 illustrates a read transfer operation in which the network interface 20a reads data from receiver 16a. Similar to FIG. 8, when light arrives upon the receiver photodetector, the status signal transitions to a logic low voltage value. The network interface will then initiate a transfer by driving the status pin to mid-rail and thereafter the receiver releases the status pin. The network interface forwards the 01 start code and the network interface, as the master device, sends the address. The read/write bit will be at a logic high voltage value indicating a read operation. The network interface will thereafter release the status pin after sending the read bit. The receiver then sends the start code (01) and the receiver will then send the data, beginning with the most significant bit of an 8-bit data packet.

It would be appreciated by those skilled in the art having the benefit of this disclosure that the embodiments described herein are believed to be capable of applications involving a portable power supply, such as a battery, where power consumption and power management must be carefully monitored. According to one embodiment, a communication network can be found within an automobile, with each node placed at selective locations within that automobile, and each node having one or more multimedia devices connected thereto. The communication links are preferably optical cable, and the receiver and transmitter within each node are preferably a fiber optic receiver and a fiber optic transmitter. However, it is recognized that other architectures and configurations are contemplated. Therefore, various modifications and changes may be made to each and every component of the network, the receiver, and the transmitter, and it is noted that the following claims can be interpreted to embrace all such modification and changes. Accordingly, the specification and drawings are to be regarded in an illustrative rather than a restrictive sense.

What is claimed is:

1. A receiver circuit, comprising:
    a first power supply pin capable of supplying a first supply amount exclusively to a first portion of the receiver circuit, wherein the first portion comprises an activity detector circuit having a photodetector coupled to a comparator and a timer;
    a second power supply pin capable of selectively supplying a second supply amount, greater than the first supply amount, exclusively to a second portion of the receiver circuit; and
    a status pin for conveying a status signal to enable the second supply amount to the second portion whenever an incoming signal is detected by the first portion.

2. The receiver as recited in claim 1, wherein the first supply amount is supplied continuously to only the first portion of the receiver circuit.

3. The receiver as recited in claim 1, wherein the first supply amount comprises a first current amount, and wherein the second supply amount comprises a second current amount.

4. The receiver as recited in claim 1, wherein the second supply amount is greater than 100 times the first supply amount.

5. The receiver as recited in claim 1, wherein the second supply amount is supplied to only the second portion of the receive circuit after the incoming signal is detected.

6. The receiver as recited in claim 1, wherein the second portion comprises a data input port and a data processor.

7. A communication network, comprising:
    a receiver comprising an activity detector and a data processor, wherein the activity detector is coupled to receive a first power supply pin and the data processor is coupled to receive a second power supply pin;
    a voltage reference generator for producing a first supply amount forwarded to the first power supply pin; and
    a network interface coupled to the receiver and comprising logic for enabling a second supply amount forwarded to the second power supply pin only when the activity detector detects a signal applied to the receiver.

8. The communication network as recited in claim 7, wherein the activity detector and the data processor are coupled to a photodetector.

9. The communication network as recited in claim 7, wherein the receiver further comprises a status pin for producing a status signal to indicate when the activity detector detects the signal applied to the receiver.

10. The communication network as recited in claim 7, wherein a status pin upon the receiver and network interface is linked for transmitting an address between the receiver and the network interface.

11. The communication network as recited in claim 7, wherein a status pin upon the receiver and network interface is linked for transmitting data between the receiver and the network interface.

12. The communication network as recited in claim 11, wherein the address and the data are separated by a write bit or a read bit of opposite logic states.

13. The communication network as recited in claim 7, wherein a status pin upon the receiver and network interface is linked for transmitting a voltage approximately half a logic one value from the network interface to signal the start of an address transfer from the network interface.

14. The communication network as recited in claim 7, wherein the network interface comprises the voltage reference generator upon a single monolithic substrate and the network interface, except for the voltage reference generator and the logic, is coupled to receive the second supply amount.

15. The communication network as recited in claim 7, wherein the voltage reference generator comprises an amplifier having one input coupled to receive a reference voltage and the other input coupled to receive a voltage-divided output from the amplifier.

16. The communication network as recited in claim 15, wherein the amplifier comprises a comparator.

17. The communication network as recited in claim 15, wherein the amplifier receives power through a resistor coupled to a battery.

18. The communication network as recited in claim 7, wherein the receiver is coupled to receive a command signal sent from a downstream network interface linked to the receiver via a network, and wherein the downstream network interface computes whether a downstream receiver coupled to the downstream network interface receives an incoming signal that is greater than or less than a predetermined value and for sending a power down or power up value, respectively, as at least a part of the command signal over the network to the receiver.

19. The communication network as recited in claim 18, further comprising a driver circuit coupled to receive the command signal via the receiver and for applying the driver circuit output to a transmitter for changing the output from the driver circuit depending on whether the command signal comprises a power down or power up value.

20. The communication network as recited in claim 19, further comprising a calibration test fixture coupled to the receiver and the transmitter for varying the driver circuit output to where the receiver receives an incoming message from the calibration test fixture when the transmitter output power is equal to a predetermined value.

21. The communication network as recited in claim 7, wherein the activity detector and the data processor are embodied upon a single, first monolithic substrate separate from the network interface embodied upon a single, second monolithic substrate.

* * * * *